(12) United States Patent
Yang

(10) Patent No.: US 7,121,864 B1
(45) Date of Patent: Oct. 17, 2006

(54) MODULE CONNECTOR

(75) Inventor: Meng-Huan Yang, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/239,920

(22) Filed: Sep. 30, 2005

(51) Int. Cl.
*H01R 13/62* (2006.01)

(52) U.S. Cl. .................................... 439/331

(58) Field of Classification Search ............. 439/331, 439/73
See application file for complete search history.

(56) References Cited

U.S. PATENT DOCUMENTS 4,433,886 A * 2/1984 Cassarly et al. .............. 439/65

6,862,804 B1 * 3/2005 Nishio et al. ................ 29/840
2004/0068868 A1   4/2004 Nishio et al.

* cited by examiner

*Primary Examiner*—Javaid H. Nasri
(74) *Attorney, Agent, or Firm*—Wei Te Chung

(57) ABSTRACT

A module connector (100), to which a module body is electrically connected, includes an insulating housing (1), a number of contacts (2) received in the insulating housing (1), a shell (3) and a holding member (4). The insulating housing (1) defines a chamber (14) for accommodating the module body. The shell (3) is assembled onto the insulating housing (1). The holding member (4) cooperates with the shell (3) to securely accommodate the module body in the insulating housing (1), thereby electrically connecting the contacting portions of the contacts (2) with the module body accommodated in the chamber (14) of the insulating housing (1).

8 Claims, 5 Drawing Sheets

MODULE CONNECTOR

BACKGROUND OF THE INVENTION

1. Field of the Invention

The present invention relates to a module connector to which a module body, such as a memory module or a camera module, is firmly fitted.

2. Description of Related Art

With development of cellular mobile phones or the likes, a lot of additional functions, such as taking pictures etc., are added to the mobile phones or the likes. In order to achieve functions such as taking pictures etc., camera modules are furnished to the mobile phones or the likes in virtue of module connectors.

US Pat. Pub. No. 2004/0068868 disclosures a module connector to which a camera module can be fitted. The modular connector defines a chamber for accommodating the camera module and comprises a plurality of contacts disposed on sidewalls thereof with contacting portions exposed into the chamber. The camera module is provided with a plurality of electrical pads arranged on an outer periphery thereof corresponding to the contacting portions of the contacts of the module connector. When assembled, the camera module is downwardly inserted into the chamber of the module connector to achieve electrical connection between the electrical pads thereof and the contacts of the module connector.

However, because the camera module is directly received into the chamber of the module connector without the aid of additional holding appliance, reliable electrical connection between the pads of camera module and the contacts of the module connector can't assure when encountering vibration, thus affecting signal transmission.

Hence, an improved module connector is required to overcome the disadvantages of the prior art.

SUMMARY OF THE INVENTION

An object of the present invention is to provide a module connector which can firmly accommodate a camera module therein.

Accordingly, to achieve above-mentioned object, a module connector, to which a module body is electrically connected, comprises an insulating housing, a plurality of contacts received in the insulating housing, a shell and a holding member. The insulating housing defines a chamber for accommodating the module body. The contacts comprise a plurality of contacting portions exposed in the chamber of the housing for electrically connecting with the module body. The shell is assembled onto the insulating housing. The holding member cooperates with the shell to securely accommodate the module body in the insulating housing, thereby electrically connecting the contacting portions of the contacts with the module body accommodated in the chamber of the insulating housing.

The detailed features of the present invention will be apparent in the detailed description with appropriate reference to the accompanying drawings.

DETAILED DESCRIPTION OF THE INVENTION

Figure 1:
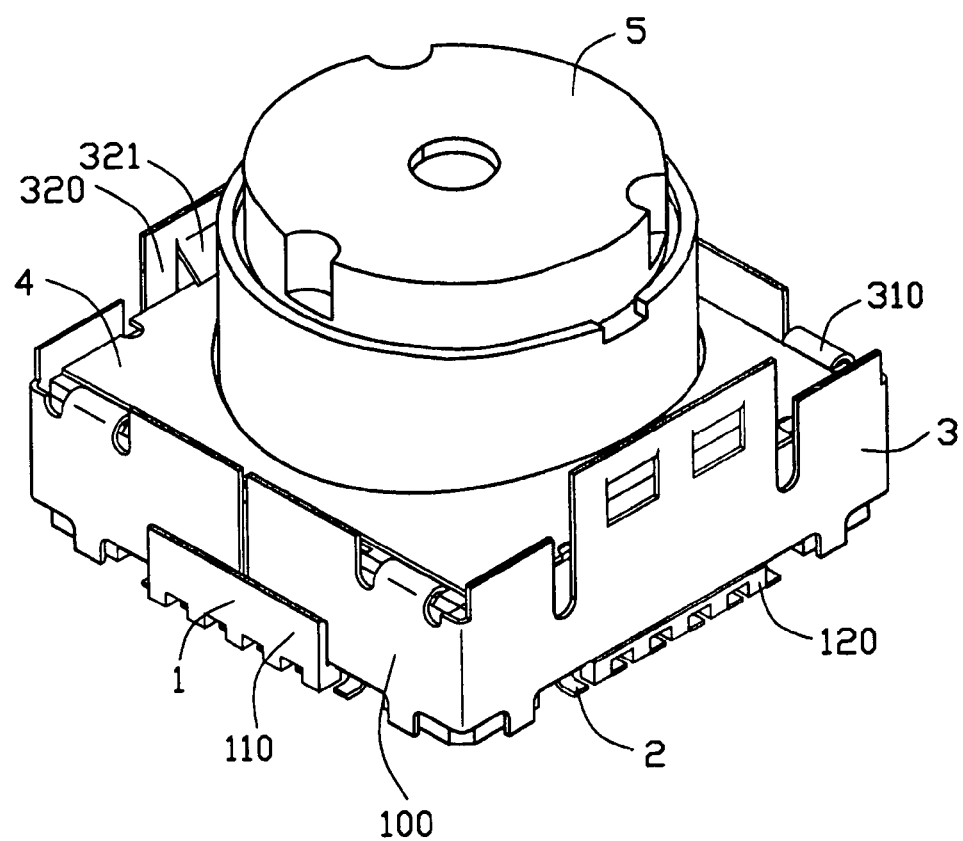
FIG. 1 is an assembled, perspective view of a module connector in accordance with the present invention in which a camera module is accommodated.
Figure 2:
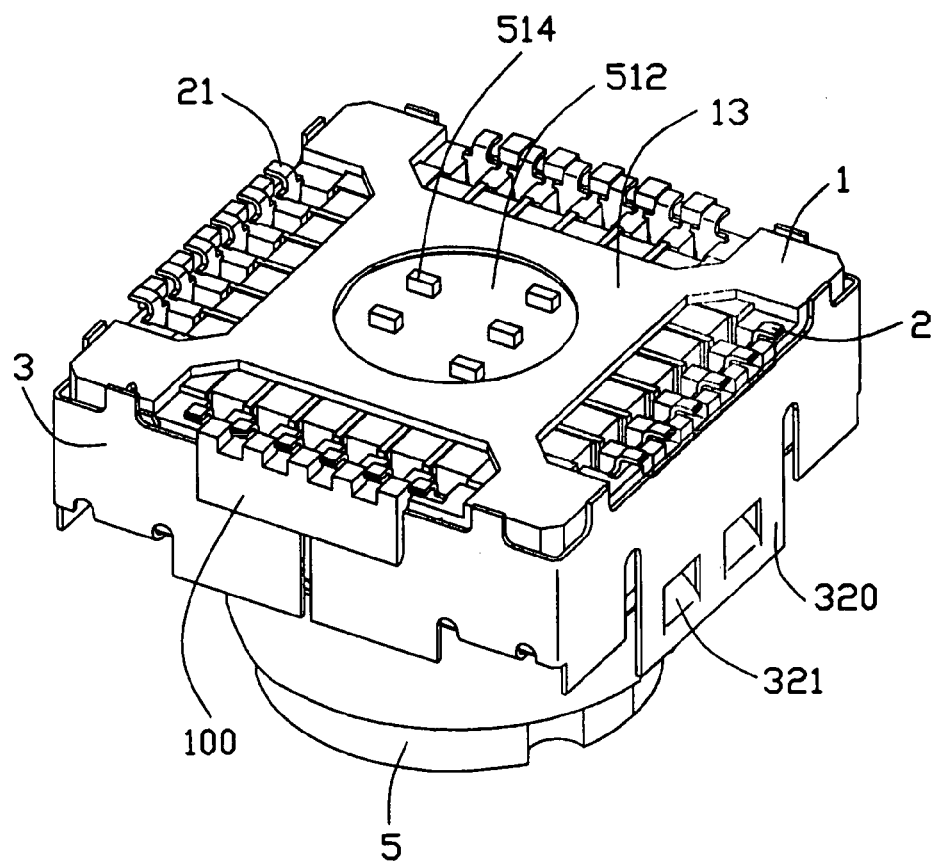
FIG. 2 is an assembled, perspective view of the module connector shown in FIG. 1, but from another aspect.
Figure 3:
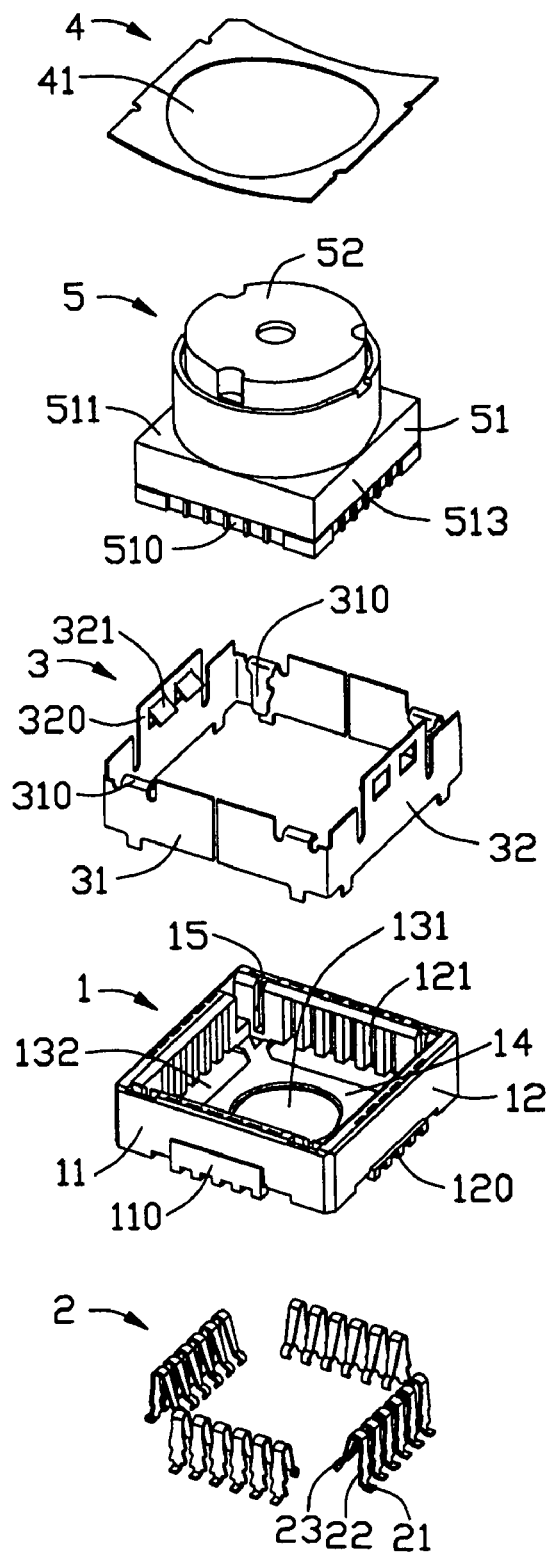
FIG. 3 is an exploded, perspective view of FIG. 1.
Figure 4:
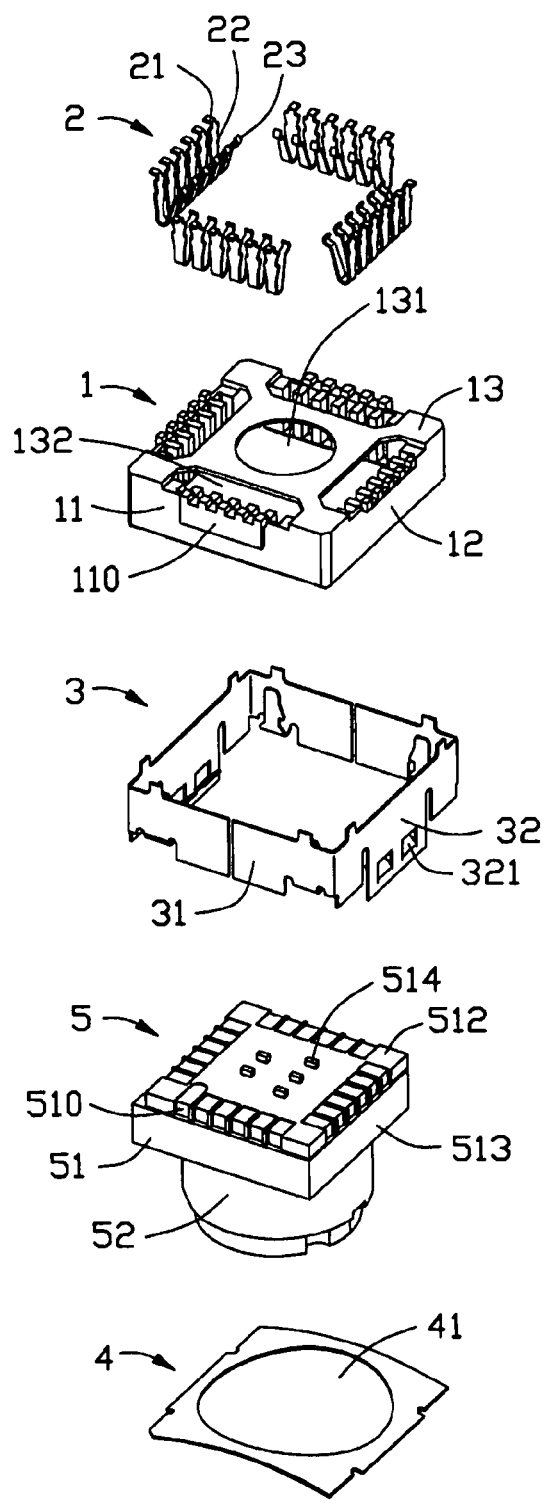
FIG. 4 is an exploded, perspective view similar to FIG. 3, but from another aspect.

Referring to FIGS. 3 and 4, the module connector 100 in accordance with the present invention is adapted for electrically connecting a module body, such as a camera module 5, with a wiring board (not shown). The module connector 100 comprises an insulating housing 1, a plurality of contacts 2 received in the insulating housing 1, a conductive shell 3 enclosing the insulating housing 1 and a holding member 4.

Referring to FIGS. 3 and 4, the camera module 5 comprises a cubic base portion 51 served as a lower portion and a column portion 52 served as an upper portion extending upwardly from the base portion 51. The base portion 51 comprises a top face 511, a bottom face 512 opposite to the top face 511 and a plurality of side faces 513. The camera module 5 further comprises a plurality of contacting pads 510 arranged at connections between the bottom face 512 and the side faces 513. In addition, the camera module 5 comprises a plurality of stand offs 514 formed on the bottom face 512 thereof.

The insulating housing 1 is approximately a square box-like body. The insulating housing 1 comprises front and rear walls 11, a pair of right and left sidewalls 12 and a bottom wall 13, which commonly define an upwardly-open chamber 14 for accommodating the camera module 5. The bottom wall 13 is formed with a hole 131 in middle thereof. A plurality of cuts 132 are formed at corners between the sidewalls 12 and the bottom wall 13 and between the walls 11 and the bottom wall 13, respectively.

Figure 5:
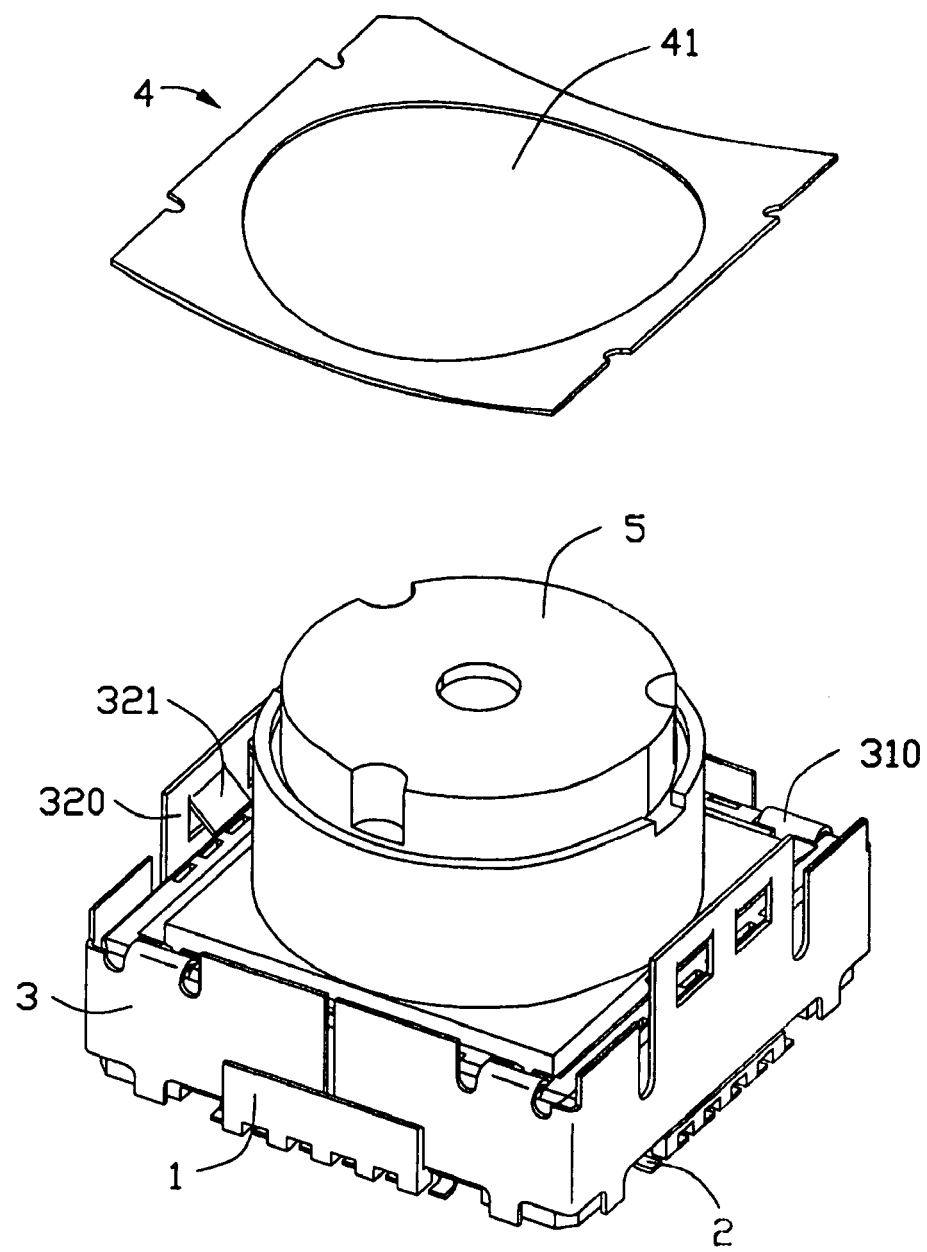
FIG. 5 is an assembled, perspective view of the module connector shown in FIG. 1 with a holding member not assembled.

Referring to FIGS. 3, 4 and 5, the insulating housing 1 is formed with protruding pieces 110 extending upwardly and outwardly from lower sides of the front and rear walls 11 to define slots (not labeled) between the protruding pieces 110 and the front and rear walls 11, respectively. A pair of ribs 120 protrude outwardly from lower sides of the sidewalls 12 of the insulating housing 1. Furthermore, the insulating housing 1 defines a plurality of recesses 15 on the front and rear walls 11 adjacent to the sidewalls 12 respectively to communicate with the chamber 14 thereof.

Each contact 2 comprises a vertical intermediate portion 22, a horizontal soldering portion 21 extending from a bottom end of the intermediate portion 22 and a contacting portion 23 extending inversely and downwardly from a top end of the intermediate portion 22. The insulating housing 1 defines a plurality of passages 121 communicating with the chamber 14 on the sidewalls 12 and the front and rear walls 11 along a top-bottom direction, respectively. The intermediate portion 22 is received in the corresponding passage 121. The contacting portion 23 is exposed into the chamber 14 for electrically connecting with the contacting pads 510 of the camera module 5. The soldering portion 21 is exposed into the cut 132 of the insulating housing 1 for soldering on the wiring board.

The shell 3 is stamped from a metal sheet. The shell 3 comprises opposite front and rear portions 31 and a pair of opposite side portions 32, which define a cavity (not labeled). A plurality of holding pieces 310 extend downwardly into the cavity from top ends of the front and rear portions 31 adjacent to the side portions 32, respectively. Each side portion 32 is formed with a protruding plate 320 extending upwardly therefrom. The protruding plate 320 is stamped with a pair of locking pieces 321 alignedly arranged along a front-rear direction and slantways protruding into the cavity.

When the shell 3 is assembled to and encircled the insulating housing 1, the front and rear portions 31 of the shell 3 are held in the slots between the protruding pieces 110 and the front and rear walls 11 of the insulating housing 1. Lower sides of the side portions 32 of the shell 3 collide with upper faces of the ribs 120 of the sidewalls 12 thereof. The holding pieces 310 of the shell 3 are held in the corresponding recesses 15 of the insulating housing 1. Therefore, the shell 3 is assembled to the insulating housing 1 securely. In this situation, the locking pieces 321 of the side portions 32 slantways protrude towards the chamber 14 of the housing 1.

Referring to FIGS. 1 to 5, the holding member 4 is a slightly arc plate configuration and defines a through hole 41 in middle thereof. The column portion 52 of the camera module 5 passes through the through hole 41 of the holding member 4 so that the base portion 52 thereof is accommodated in the chamber 14 of the insulating housing 1. The column portion 52 locates beyond the chamber 14. The contacting pads 510 contact with the contacting portions 23 of the contacts 2. The stand offs 514 expose outside of the hole 131 of the insulating housing 1.

Then, when the holding member 4 assembled, firstly, the column portion 52 of the camera module 5 fitly passes through the through hole 41 of the holding member 4 and the holding member 4 collides with the top face 511 of the camera module 5. Then, to continue to press downwardly against the holding member 4, the holding member 4 locates below the locking pieces 321 of the shell 3 and the locking pieces 321 presses against opposite edges of the holding member 4 so as to abut tightly against each other. Thus, the holding member 4 presses downwardly against the top face 511 of the camera module 5. In addition, because of the resilient arc configuration of the holding member 4, the holding member 4 presses tightly and downwardly against the top face 511 of the camera module 5 better to make the base portion 51 of the camera module 5 firmly accommodate in the chamber 14 of the insulating housing 1 securely.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A module connector, to which a module body is electrically connected, comprising:
   an insulating housing defining a chamber for accommodating the module body;
   a plurality of contacts received in the insulating housing comprising a plurality of contacting portions exposed in the chamber of the housing for electrically connecting with the module body;
   a shell assembled onto the insulating housing; and
   a holding member having a top surface cooperating with the shell to securely accommodate the module body in the insulating housing, thereby electrically connecting the contacting portions of the contacts with the module body accommodated in the chamber of the insulating housing;
   wherein the insulating housing comprises front and rear walls and a pair of opposite sidewalls connecting the front and the rear walls;
   wherein the insulating housing is formed with protruding pieces protruding outward and upward from the front and rear walls respectively to define slots between the protruding pieces and the front and rear walls to receive lower edges of front and rear portions of the shell;
   wherein the insulating housing is formed with ribs protruding outward from the corresponding sidewalls to engage with lower edges of opposite side portions of the shell;
   wherein the front and rear walls defines a recess communicated with the chamber adjacent to the sidewalls respectively, and wherein the shell comprises holding pieces on front and rear portions thereof to receive in the recesses of the front and rear wails of the insulating housing.

2. The module connector as described in claim 1, wherein the module body is camera module.

3. The module connector as described in claim 1, wherein the holding member is a plate configuration.

4. The module connector as described in claim 3, wherein the holding member is curved downwardly.

5. The module connector as described in claim 3, wherein the shell is formed with a locking piece protruding towards the chamber of the insulating housing to cooperate with the holding member.

6. The module connector as described in claim 3, wherein the holding member is formed with a hole adapted for being passed through by an upper portion of the module body, and wherein the holding member is adapter for pressing against a lower portion of the module body.

7. A module socket assembly comprising:
   a module and a connector,
   said connector including:
   an insulating housing defining a module receiving cavity;
   a plurality of contacts disposed in the housing with contacting portions inwardly extending into the module receiving cavity;
   a module received in the module receiving cavity; and
   an urging device including a first section downwardly pressing the module, and a second section having an engaging portion not lower than an urging plane of said module and engaged with the connector so as to prevent the urging device from being withdrawn from the connector by a reaction force derived from the module and imposed thereupon;
   wherein said urging device is essentially located upon the urging plane of said module;
   wherein said second section is higher than the first section;
   wherein said second section is engaged with a metallic shell of said connector, said metallic shell enclosing said housing;
   wherein said urging device is essentially located within the module receiving cavity.

8. A module connector comprising:
   an insulating housing defining a module receiving cavity;
   a metallic shield enclosing the housing;
   a plurality of contacts disposed in the housing with contacting portions inwardly extending into the module receiving cavity; and
   an urging device enclosed by the metallic shield and including a first section extending into the module receiving cavity for engaging with the nodule which is adapted to be received in the module receiving cavity, and a second section engaged with at least one of said housing and said metallic shield for retaining said urging device in position relative to the housing;
wherein the second section is engaged with the shield;
wherein said urging device is a spring plate; wherein said spring plate has a central opening for receiving a circular portion of the module;
wherein said urging device is essentially located with the module receiving cavity.

* * * * *